United States Patent [19]
Veendrick

[11] Patent Number: 6,081,149
[45] Date of Patent: Jun. 27, 2000

[54] ELECTRONIC CIRCUIT WITH A CLOCK SWITCH

[75] Inventor: Hendricus J. M. Veendrick, Eindhoven, Netherlands

[73] Assignee: U.S. Philips Corporation, New York, N.Y.

[21] Appl. No.: 09/211,927

[22] Filed: Dec. 15, 1998

[30] Foreign Application Priority Data

Dec. 16, 1997 [EP] European Pat. Off. ............. 97203960

[51] Int. Cl.[7] ............................... H03K 1/04; H03K 3/00
[52] U.S. Cl. ............................................................. 327/295
[58] Field of Search ..................................... 327/291–293, 327/294, 296, 376, 377, 386, 392, 415

[56] References Cited

U.S. PATENT DOCUMENTS

| | | | |
|---|---|---|---|
| 5,668,492 | 9/1997 | Pedersen et al. ................... | 327/291 |
| 5,850,157 | 12/1998 | Zhu et al. ............................ | 327/295 |
| 5,852,378 | 12/1998 | Keeth .................................. | 327/171 |
| 5,867,043 | 2/1999 | Kim ..................................... | 327/257 |

*Primary Examiner*—My-Trang Nu Ton
*Attorney, Agent, or Firm*—Brian J. Wieghaus

[57] ABSTRACT

An electronic circuit comprises clocked functional circuits which receive a clock signal via a clock switch. The clock switch contains an enabled non-inverting driver which switches a connection between a power supply input and a clock output on and off under control of a clock signal only when the clock switch is enabled by an enable signal. The clock switch also contains a transmission switch coupled between a clock input and the clock output. The transmission switch is controlled from the enable input and makes a conductive connection between the clock input and the clock output only when the clock switch is enabled by the enable signal. As a result, transitions in the clock signal reach the functional circuits with less delay and power take-up needed to drive the clock signal is distributed so that there is less supply bounce.

4 Claims, 2 Drawing Sheets

ELECTRONIC CIRCUIT WITH A CLOCK SWITCH

The invention relates to an electronic circuit.

Transitions of the clock signal in an electronic circuit cause functional circuits to dissipate power. Clock switches which disable the supply of the clock signal to parts of the circuit may be used to reduce the power consumption of electronic circuits. During operation of the electronic circuit changes in signals from some functional part of the electronic circuit may be irrelevant to the function of the electronic circuit in some time intervals and relevant in other time intervals. Power can be conserved when no transitions of the clock signal are supplied to the functional circuits during such time intervals, without affecting the function of the electronic circuit. Hence, power is saved by using a clock switch to supply the clock signal to a functional part and disabling the supply of the clock signal during selected time-intervals when the functional part does not need to receive clock transitions for contributing to the function of the electronic circuit.

Using a clock switch for a part of the electronic circuit has the additional advantage that the power used to realize the clock signal may be taken up from the power supply in a spatially distributed way, partly in the clock switch and partly in a clock driver which supplies the clock signal to the clock switch. Thus, problems due to power supply bounce are reduced.

However, the clock switch has a delaying effect upon the clock signal: transitions in the clock signal will occur at the output of the clock switch later than at the input of the clock switch. The delay can hamper the operation of the electronic circuit and it limits the maximum useful operating frequency: the larger the delay, the lower the maximum useful frequency.

Amongst others it is an object of the invention to provide for an electronic circuit in which the delay caused by the clock switch is reduced, while retaining the advantages of reduced power consumption and distributed power supply take-up as much as possible.

The electronic circuit according to the invention is set forth in claim 1. According to this claim, an enable-controlled driver is able to supply most of the power that creates clock transitions locally. A conduction path for the clock signal is included in parallel with the enable-controlled driver when the clock signal is enabled. The transmission switch and the driver are dimensioned related to one another so that the conduction path helps to speed up an early stage of clock transitions, the driver doing most of the driving in a later stage of the clock transition.

Claim 2 describes an embodiment of the electronic circuit according to the invention. Power take-up is distributed by locating the clock switch closer to the functional circuit than to the clock driver if that functional circuit receives its clock signal from the clock switch. This reduces power supply bounce problems. Preferably, the clock switch is located as close a possible to the functional circuits, e.g. at less than 10% of the conductive line distance to the clock driver.

Claim 3 describes another embodiment of the electronic circuit according to the invention. The first and second transistor are part of a logic gate, for example a NAND gate. An internal node of the logic gate is used to create a complement of the enable signal to control the complementary transistors in the transmission switch. Transitions in the clock signal ensure that the potential of the internal node does not float when the clock switch is disabled.

Claim 4 describes another embodiment of the electronic circuit according to the invention. In this embodiment the clock switch and the functional circuits are connected to the same power supply line, so that the clock switch and the functional circuits are not connected to the power supply line between the central power supply and any interconnection from which power is supplied to further functional circuits that are not clocked via the clock switch. Thus power supply fluctuations are kept local.

These and other advantageous aspects of the electronic circuit according to the invention will be described by way of non-limitative example using the attached figures, of which FIG. 1 shows an electronic circuit according to the invention.;

Figure 1:
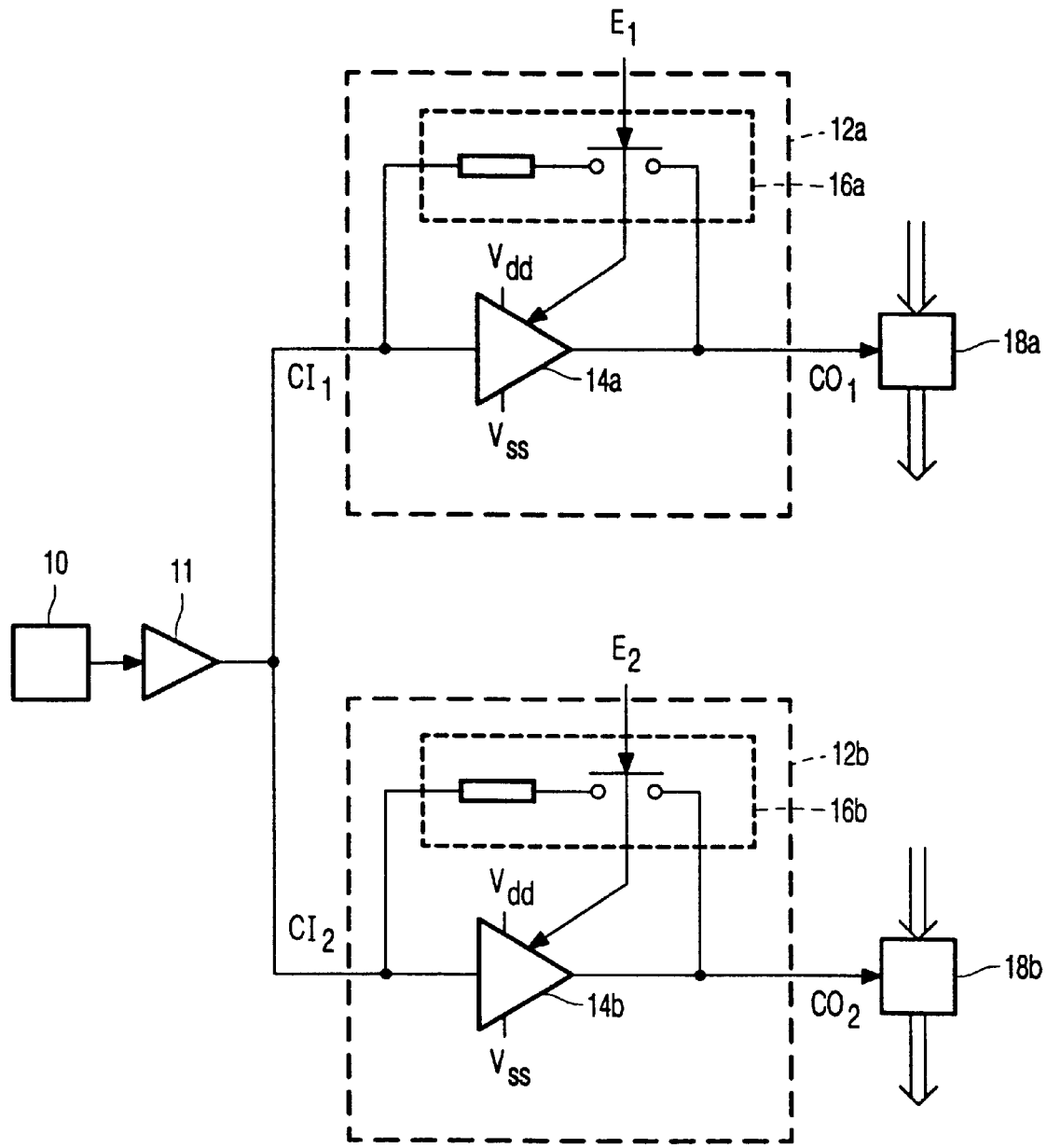

FIG. 1 shows an electronic circuit comprising a clock oscillator 10 coupled to a clock driver 11. An output of the clock driver 11 is coupled to the input of two clock switches 12a,b. Each clock switch 12a,b has an output coupled to a respective functional circuit 18a,b. Each clock switch 12a,b contains an enabled driver 14a,b and a transmission switch 16a,b, in parallel between the input and the output of the clock switch 12a,b. The enabled driver is powered by the power supply connections Vdd, Vss. The transmission switch is shown as an impedance R in series with an on/off switch. Each clock switch 12a,b has an enable input, coupled to control inputs of the enabled driver 14a,b and the transmission switch 16a,b of the relevant clock switch 12a,b respectively.

In operation the clock oscillator 10 generates a central clock signal which is supplied to the clock switches 12a,b by the clock driver 11. The clock switches 12a,b each generate a local clock signal from the central clock signal and supply this local clock signal to the functional circuits 18a,b. The functional circuits 18a,b perform various functions synchronous to the respective local clock signals supplied to them by the clock switches 12ab.

A controller (not shown) determines when each specific functional circuit 18a,b needs to receive a clock signal in order to perform any function of the electronic circuit and when it is not necessary that a specific functional circuit 18a,b receives a clock signal. The controller supplies enable signals to the clock switches 12a,b according to this need.

Each particular clock switch 12a,b supplies the local clock signal to the relevant functional circuit 18a,b only when an active enable signal is applied to the enable input of the particular clock switch 12a,b. When the enable signal is active, the enabled driver 14a,b of the particular clock switch 12a,b is enabled; otherwise the enabled driver 14a,b is disabled. Also when the enable signal is active, the transmission switch 16a,b of the particular clock switch 12a,b is made conductive and the transmission switch 16a,b is made non-conductive otherwise.

The following happens when the enable signal of a clock switch 14a,b is active. The connection to the functional circuits 18a,b and the functional circuits 18a,b themselves constitute a load for the clock switch 12a,b. This load is mainly capacitive. The central clock signal which arrives at the input of the clock switch 12a,b drives the enabled driver 14a,b. When the central clock signal is high, the enabled driver 14a,b connects the output of the clock switch 12a,b to the connection for the high supply voltage Vdd, when the central clock signal is low the enabled driver connects the output of the clock switch 12a,b to the connection for the low supply voltage Vss. In this way the enabled driver 14a,b charges or discharges the load of the clock switch 12a,b. In parallel, the transmission switch 16a,b provides a connection between the input of the clock switch 12a,b to the output of the clock switch 12a,b.

Thus, the central clock signal also contributes to charging or discharging of the load of the clock switch 12a,b. After a transition of the clock signal, the enabled driver 14a,b will exhibit a certain delay-time interval before it starts charging or discharging the load of the clock switch 12a,b, as appropriate after the transition. During this delay-time interval, the transmission switch 14a,b will already begin the charging or discharging as appropriate.

The speed with which the load of the clock switch 12a,b is charged increases with decreasing impedance of the transmission switch 16a,b. Preferably, the impedance of the transmission switch 16a,b is selected at least so large that the time that would be needed to charge the load with only the transmission switch 16a,b is at least of the same order of magnitude as the delay-time of the enabled driver 14a,b (e.g. greater than that delay-time or not more than a factor two smaller than that delay-time). In this way, wasted power consumption due to conflicting driving of the load is kept small. Furthermore, this will generally mean that the impedance of the transmission switch 16ab is generally bigger than that of the clock driver 11 so that the clock switch at least temporarily does not act as a latch (otherwise, this has to be ensured separately by selecting proper ratios between the drive power of the clock driver 11 on one hand and the combination enabled driver 12a,b followed by transmission switch 16a,b on the other hand.

The clock switch 12a,b is generally located spatially closer to the functional circuits 18a, b to which it supplies the clock signal than to the clock driver 11 from which it receives the central clock signal. For example, on an integrated circuit chip, each clock switch 12a,b will be located near its relevant functional circuits 18a,b, whereas the clock driver may be located anywhere, for example on the periphery of the integrated circuit chip. A result, the current take-up from the power supply that is used to charge the load of the clock switch is distributed over the integrated circuit chip, because part of this current take-up occurs in the clock switch 12a,b and part of the current take-up occurs in the clock driver 11, which supplies the current that flows through the transmission switch 16a,b. The distribution of current take-up reduces the effect of power supply bounce caused by transitions of the clock signal.

When the enable signal is not active, the transmission switch 16a,b is non-conductive and the enabled driver 14a,b is disabled so that it keeps the output clock signal supplied to the functional circuits at a time independent logic level (called the "passive" level), irrespective of any transitions in the input clock signal. The transition between an active enable signal and a non-active enable signal occurs preferably when the central clock signal is at the passive level. This may be ensured for example in a way known per se by supplying the enable signal from a flip-flop that changes state only outside the periods of the central clock where the central clock signal has a level logically opposite to the passive level.

Figure 2:
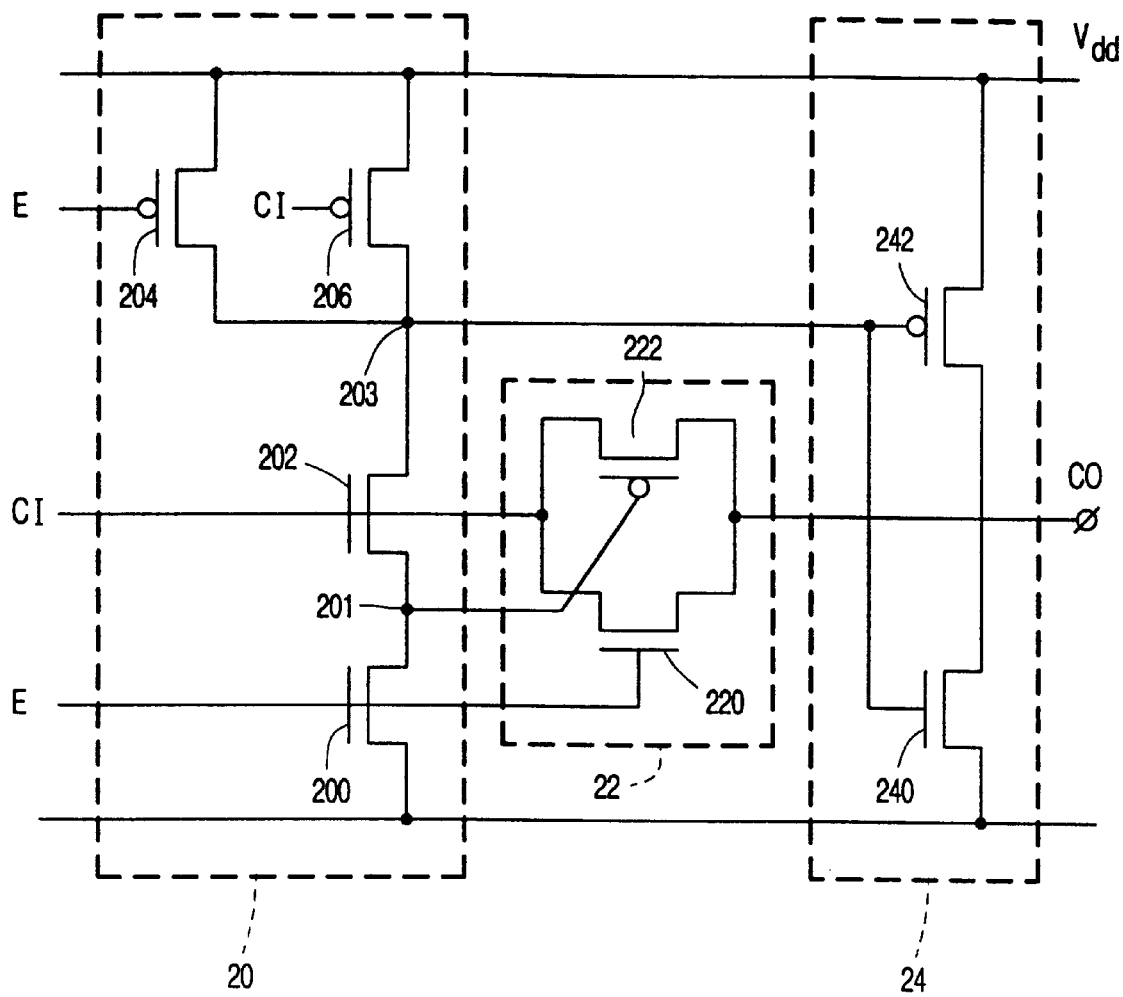
FIG. 2 shows an embodiment of a clock switch.

FIG. 2 shows a circuit which implements a clock switch. The circuit contains a NAND section 20, with an output coupled to an input of an inverter section 24. An enable input E of the clock switch is coupled to a first input of the NAND section 20. A clock input CI of the clock switch is coupled to a second input of the NAND section 20 and a clock output of the clock switch is coupled to the output of the inverter 24. A transmission gate 22 is coupled between the clock input CI and the clock output CO.

The NAND section 20 has power supply inputs Vdd and Vss. Between the Vss and Vdd inputs the NAND section 20 contains successively the channel of a first NMOS transistor 200, a first node 201, the channel of a second NMOS transistor 202 and a second node 203. The second node 203 is coupled to the VDD input Vdd via a parallel arrangement of the channels of a first and second PMOS transistor 205, 206. The enable input E is coupled to the control electrodes of the first NMOS transistor 200 and the first PMOS transistor 204. The clock input CI is coupled to the control electrodes of the second NMOS transistor 202 and the second PMOS transistor 206.

The inverter section 24 is also connected to the Vdd input and the Vss input. From the Vss input the inverter section 24 contains successively in series the channel of a third NMOS transistor 240, an output node 241, the channel of a third PMOS transistor and the Vdd input. The control electrode of the third NMOS transistor 240 and the third PMOS transistor 242 are connected to each other and to the second node 203 of the NAND section 20. The output node 241 is coupled to the clock output CO.

The transmission gate 22 contains the channels of a fourth NMOS transistor 220 and a fourth PMOS transistor 222 coupled in parallel between the clock input CI and the clock output CO. A control electrode of the fourth NMOS transistor 220 is coupled to the enable input E. A control electrode of the fourth PMOS transistor 222 is coupled to the first node 201 of the NAND section 20.

In operation, the NAND section 20 and the inverter section 24 in combination perform the function of the enabled driver 14a,b of a clock switch 12a,b of FIG. 1. The transmission gate 22 performs the function of the transmission switch 16a,b of a clock switch 12a,b of FIG. 1.

The control electrode of the fourth PMOS transistor 222 in the transmission gate 24 is driven by the first node of the NAND section 20. When the enable signal E is active (HIGH) the first NMOS transistor 200 will conduct and pull the first node 201 to the Vss level. As a result, the fourth PMOS transistor 222 will conduct. When the enable signal is not active (LOW) the first NMOS transistor 200 will not conduct and the first node 201 will be pulled to the Vdd level as soon as the input clock signal becomes high. As a result the fourth PMOS transistor 222 in the transmission gate 20 will become non-conductive. In this way a logical opposition is produced between the control voltages of the control gates of the two complementary transistors 220, 222 in the transmission gate 20, without using additional components for producing the logical opposition of these control voltages.

The W/L ratio between the width and the length of the gates of the MOS transistors in the clock switch is for example W/L=30 for the first and second NMOS transistor 200, 202 and the first and second PMOS transistor 204, 206. W/L=120 for the fourth PMOS and NMOS transistor 220, 222 and the third NMOS transistor 240 and W/L=180 for the third PMOS transistor 242. Thus, the transmission gate 22 will still be charging or discharging the load of the clock switch when the delay-time between a transition at the clock input CI of the NAND section and the start of charging or discharging by the inverter section 24 elapses.

Of course the function of the circuit of FIG. 2 may be realized in many ways. For example, the role of PMOS and NMOS transistors, Vdd and Vss, logic high and logic low may be pairwise exchanged. Also the first PMOS transistor 204 might be deleted if the second node 203 is capable of holding its potential level during a period of the clock when the clock signal is logic high, or a passive load might be used instead of the first and second PMOS transistors 204, 206.

Figure 3:
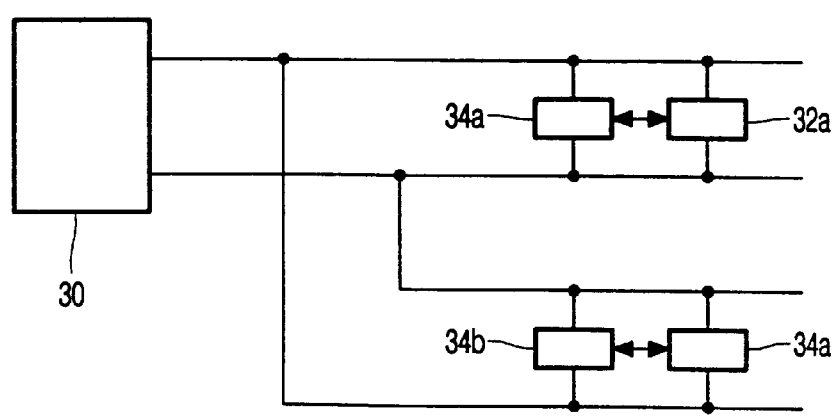
FIG. 3 shows a further electronic circuit according to the invention.

FIG. 3 shows a power supply structure of an electronic circuit according to the invention. A central power supply section 30 (which may simply be mainly a pair of power supply pads for receiving power supply from a source external to an integrated circuit chip) has a Vdd output and a Vss output line, which branch into two pairs of Vdd-Vss lines. Each pair of Vdd-Vss lines supplies power to a respective clock switch 32a,b/functional circuit 34a combination. Both the clock switch 32a and the functional circuit 34a,b of the combination are connected "downstream" from the point where the power supply lines branch relative to the central power supply section. In this way the functional circuit will act as a local decoupling capacitor for the clock switch 32a,b, and will help to reduce power supply interference (bounce) transmitted by the clock switch 32a,b to other parts of the circuit.

What is claimed is:

1. An electronic circuit comprising clocked functional circuits and a clock switch, the clock switch having a power supply input, an enable input for receiving an enable signal, a clock input for receiving a clock signal and a clock output coupled to the functional circuits, the clock switch containing an enable-controlled non-inverting driver which switches a connection between the power supply input and the clock output on and off under control of the clock signal only when the clock switch is enabled by the enable signal, a transmission switch coupled between the clock input and the clock output and controlled from the enable input for making a conductive connection between the clock input and the clock output only when the clock switch is enabled by the enable signal.

2. An electronic circuit according to claim 1 comprising a clock driver having an output coupled to the clock input of the clock switch, the clock driver and the functional circuits being located spatially separated from one another, the clock switch being located spatially closer to the functional circuits than to the clock driver.

3. An electronic circuit according to claim 1, wherein the enable-controlled driver comprises in series between a first and a second power supply connection successively a channel of a first transistor, a first node, a channel of a second transistor, a second node and a load circuit, the enable input being coupled to a control electrode of the first transistor and the clock input being coupled to a control electrode of the second transistor, the second node being coupled to the clock output, the transmission switch comprising channels of complementary transistors in parallel, control gates of the complementary transistors being coupled to the enable input and the first node respectively.

4. An electronic circuit according to claim 1, containing further functional circuits which receive the clock signal other than through the clock switch, wherein the functional circuits and the further functional circuits receive power from a central power supply via a first and second supply line respectively, the power supply input of the clock switch being connected to the first power supply line, the first and second power supply lines being interconnected only between the central power supply on one hand and connections of the clock switch and of the functional circuits to the first power supply line on the other hand.

* * * * *